T. GRIEVE.
APPARATUS FOR REMOVING NON-GASEOUS PARTICLES FROM THE PRODUCTS OF COMBUSTION FROM BOILERS.
APPLICATION FILED DEC. 22, 1914.
1,278,334.
Patented Sept. 10, 1918.
4 SHEETS—SHEET 4.
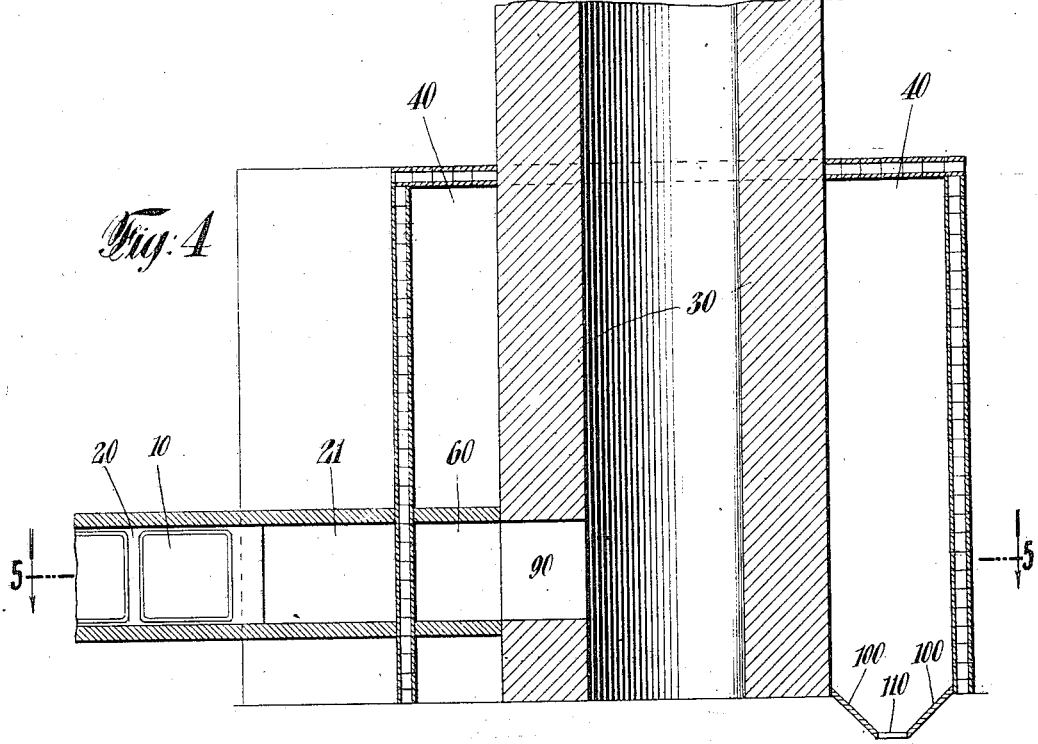
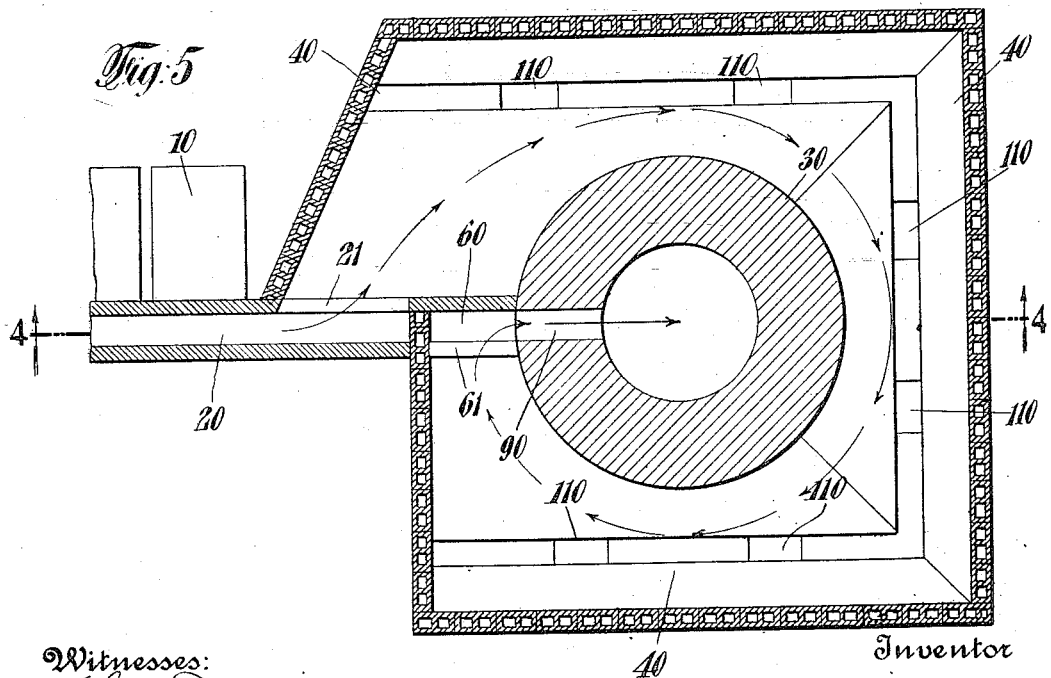

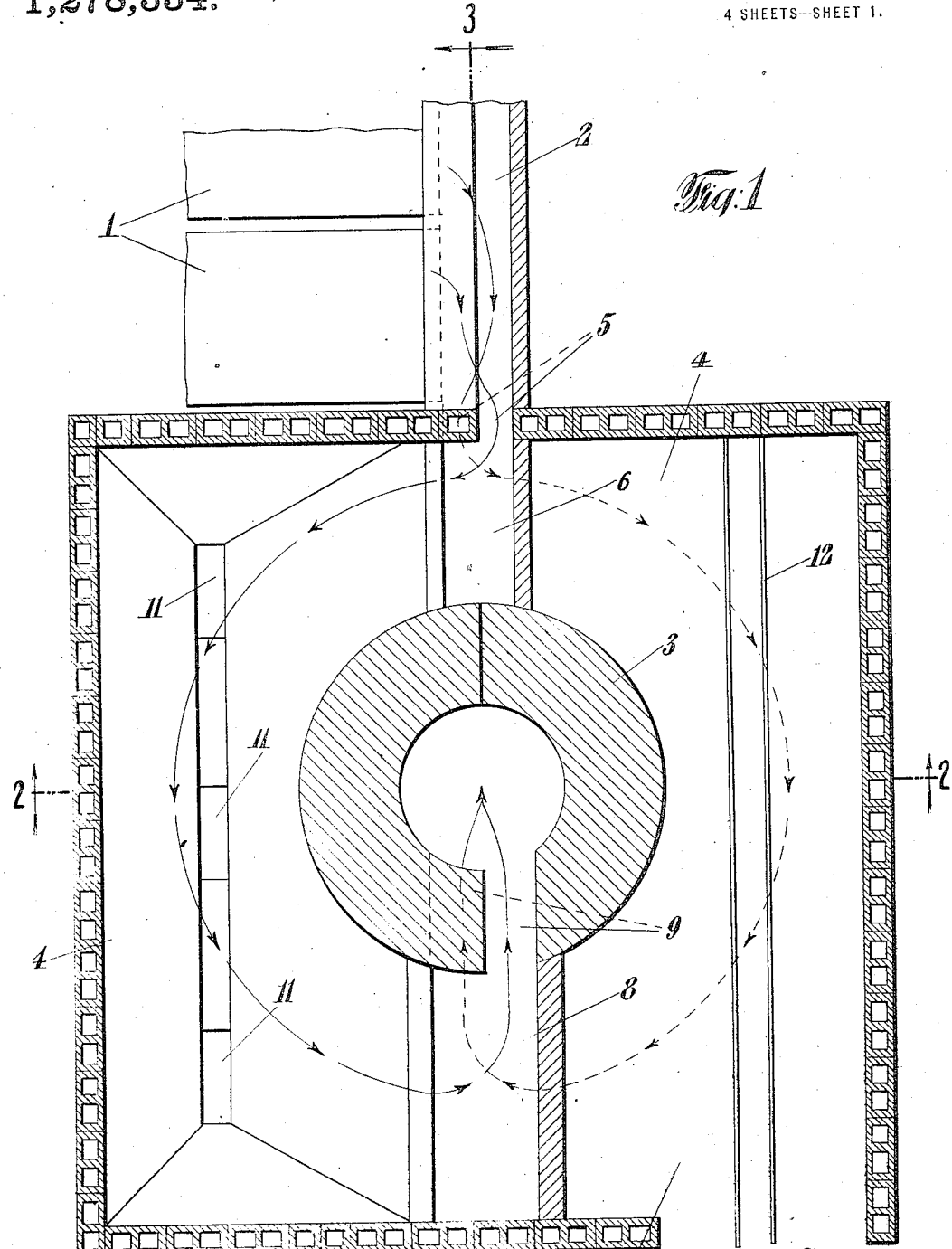

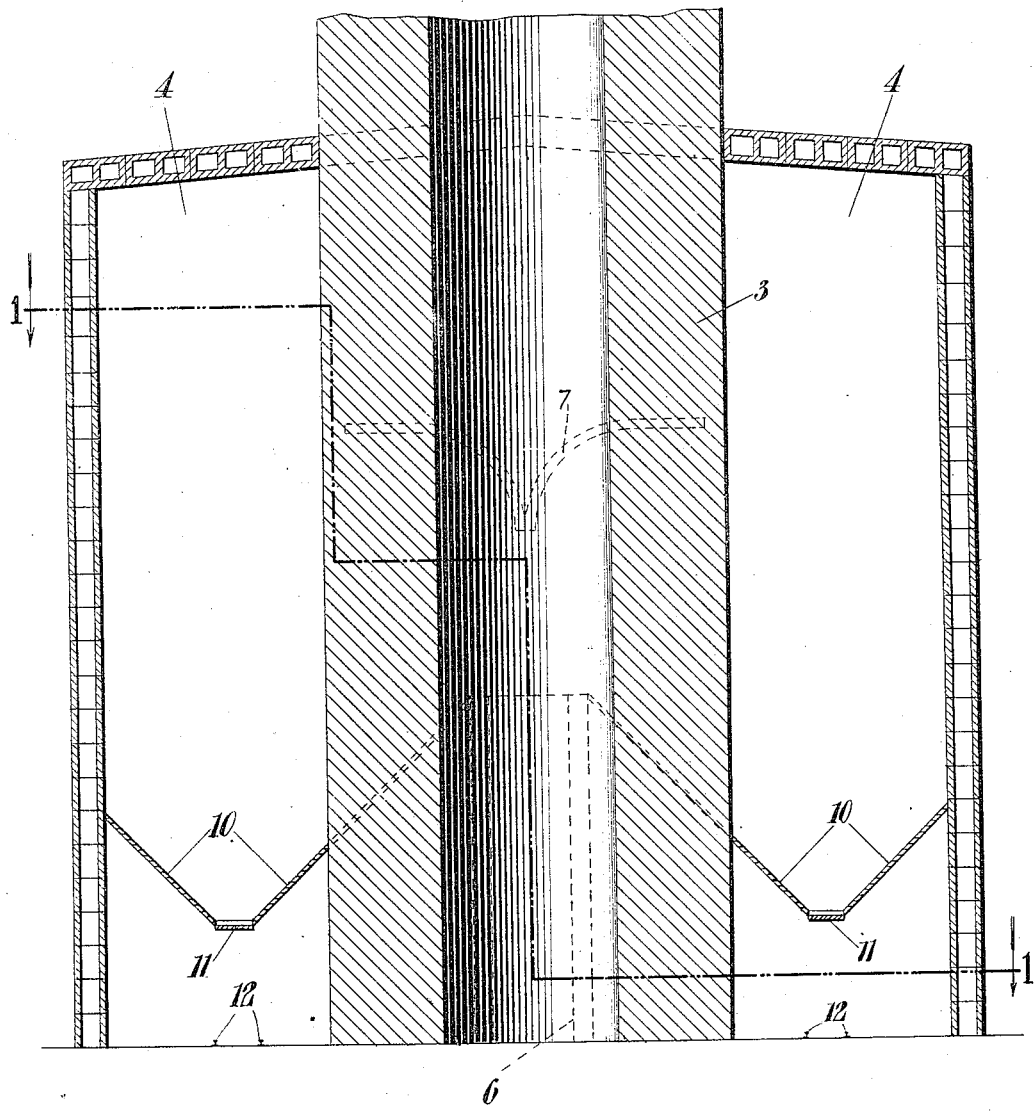

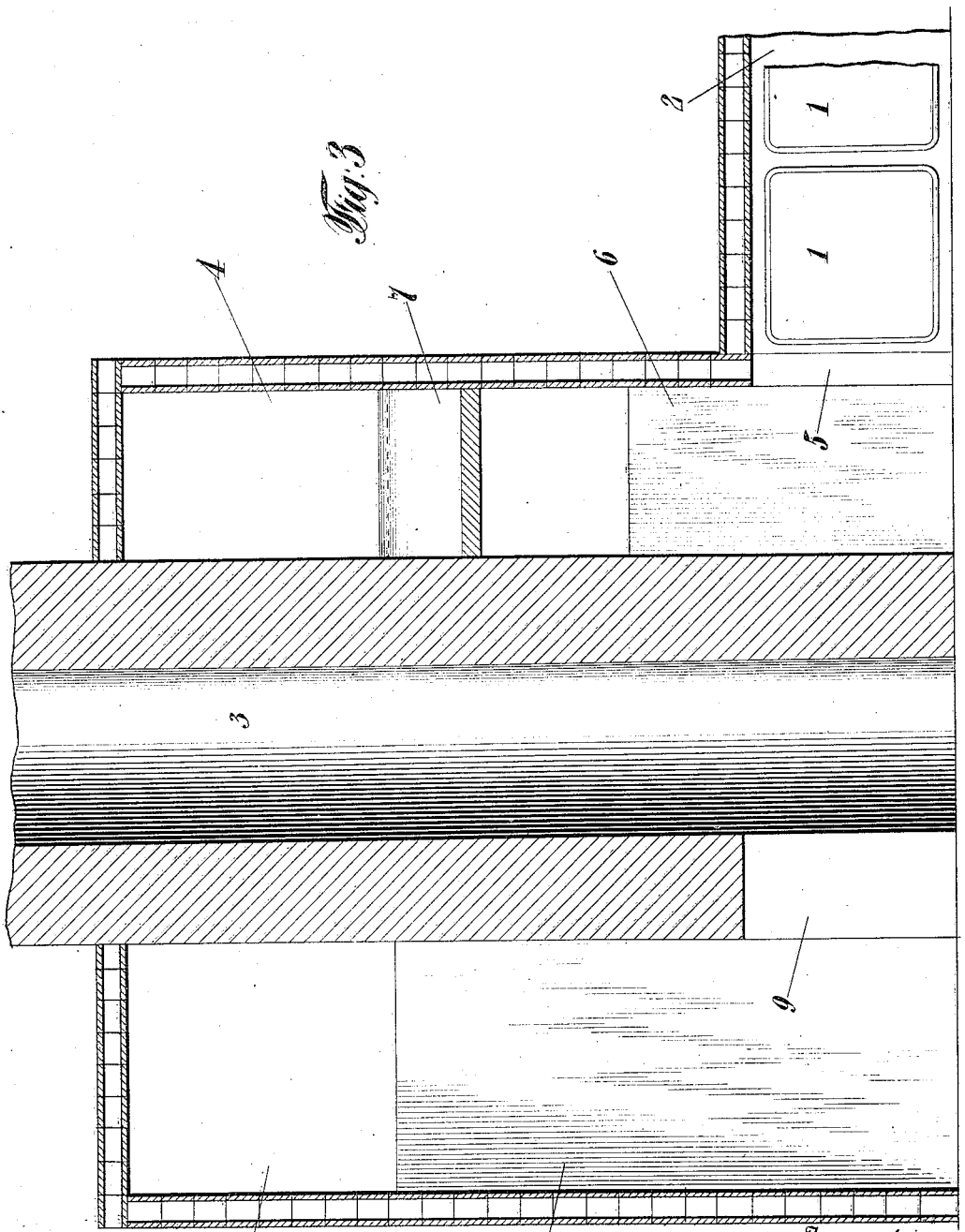

UNITED STATES PATENT OFFICE.

THOMAS GRIEVE, OF PERTH AMBOY, NEW JERSEY, ASSIGNOR OF ONE-THIRD TO JAMES M. GIFFORD, OF NEW YORK, N. Y.

APPARATUS FOR REMOVING NON-GASEOUS PARTICLES FROM THE PRODUCTS OF COMBUSTION FROM BOILERS.

1,278,334.   Specification of Letters Patent.   Patented Sept. 10, 1918.

Continuation in part of application Serial No. 814,049, filed January 24, 1914. This application filed December 22, 1914. Serial No. 878,584.

*To all whom it may concern:*

Be it known that I, THOMAS GRIEVE, of the city of Perth Amboy, in the county of Middlesex, and in the State of New Jersey, have invented a certain new and useful Improvement in Apparatus for Removing Non-Gaseous Particles from the Products of Combustion from Boilers, and do hereby declare that the following is a full, clear, and exact description thereof.

My invention relates to the removal of non-gaseous particles from the products of combustion from boilers, and has for its object to accomplish this result effectively without impairing the draft in the stack. A further object of my invention is to accomplish this result effectively without the use of deflecting plates, walls, water sprays, or other obstructions which will decrease materially the draft in the stack by their interference with the flow of said products of combustion. A further object of my invention is to accomplish this result effectively without loss of heat from said products of combustion as will increase their specific gravity to such an extent as to lessen the normal draft in the stack.

My invention has been applied to a battery of boilers normally producing 2500 boiler horse power connected to a stack approximately 175 feet high and twelve feet in diameter. Before the application of my invention thereto, the non-gaseous particles emitted from said stack were alleged by adjacent property owners to be such a nuisance that serious difficulty seemed imminent. Numerous devices and types of apparatus were investigated or tested, but either they failed in effectiveness or they interfered materially with the draft necessary to be maintained in the stack. No successful device could be found. After the application of my invention to said plant, boxes of white paper placed in the vicinity of the stack showed 100% efficiency, the draft in the stack was unimpaired, and between four and five tons of non-gaseous particles have been removed daily from the products of combustion from said boilers, all of which is available for fuel by mixing with soft coal in proper proportions.

My invention is capable of embodiment in many different forms, and while I have illustrated it in the accompanying drawings by two of the best embodiments thereof known to me, such embodiments are to be regarded as typical only of many possible embodiments.

In said accompanying drawings:

Figure 1 is an irregular, horizontal section on irregular line 1—1 of Fig. 2, looking in the direction of the arrows;

Fig. 2 a central, transverse, vertical section on line 2—2 of Fig. 1, looking in the direction of the arrows;

Fig. 3 a central, longitudinal, vertical section on line 3—3 of Fig. 1, looking in the direction of the arrows;

Fig. 4 a central, longitudinal, vertical section of a different embodiment on line 4—4 of Fig. 5, looking in the direction of the arrows; and Fig. 5 a horizontal section on line 5—5 of Fig. 4, looking in the direction of the arrows.

In the embodiment illustrated in Figs. 1, 2, and 3, I have shown a portion of a battery of boilers 1, the products of combustion or gases from which are discharged into a closed flue 2, which ordinarily leads directly into a stack 3. Between flue 2 and stack 3, I interpose a large, closed chamber 4, preferably constructed of non-heat-conducting material such, for example, as hollow tile. In the application of my invention to the plant described, chamber 4 approximately is thirty-eight (38) feet square. Flue 2 communicates with chamber 4 by an opening 5 in the back wall of chamber 4, which opening leads into a passage 6 closed on all sides except its top. Above passage 6, I preferably place a deflector 7 (shown in dotted lines, Fig. 2) to aid the flow of rising gases toward each side of chamber 4, whence they pass on each side of stack 3 to the front of the chamber, expanding both laterally and vertically, thereby lessening their rate of flow to such an extent that the non-gaseous products of combustion drop to the bottom of the chamber. Arriving at the front of chamber 4, the gases pass downward into a passageway 8, likewise closed on all sides except its top, from which they escape into the interior of stack 3 through an opening 9 in the base thereof. The bottom 10 of chamber 4 is sloped at a sufficient angle (Figs. 1 and 2), to insure the easy removal of the non-gaseous products of combustion through a series of slides 11 (Figs. 1 and 2) provided for that purpose. In a plant such as that described above, so large a quantity of non-gaseous products of combustion are removed from the gases, that tracks 12 are provided beneath slides 11, on which cars may run directly under the slides when it is desired to empty the chamber.

In the embodiment illustrated in Figs. 4 and 5 I have shown a portion of a battery of boilers 10, the products of combustion from which are discharged into a closed flue 20, which ordinarily leads directly into a stack 30. Between flue 20 and stack 30, I interpose a large closed chamber 40, preferably constructed of non-heat conducting material, such, for example, as hollow tile. Flue 20 communicates with chamber 40 by a side opening 21 therein. The gases pass around stack 30, expanding both laterally and vertically, thereby lessening their rate of flow to such an extent that the non-gaseous products of combustion drop to the bottom of the chamber. Arriving at the back of chamber 40, the gases enter a closed passageway 60 through a side opening 61, from which they escape into the interior of stack 30 through an opening 90. The bottom 100 of chamber 40 is sloped at a sufficient angle to insure the easy removal of the non-gaseous products of combustion through a series of slides 110 provided for that purpose.

It will be seen that my invention accomplishes a new and important result by means never before applied to the removal of non-gaseous particles from the products of combustion from boilers. It is, of course, well known that swiftly moving currents of fluid or air will carry very heavy substances which are dropped if the velocity of the current slackens. This principle is not new. It also is old to provide a very small space in boilers between the fire and the boiler in order to prevent ashes and small coals from entering and clogging the boiler flues, and nearly all boilers are so built, but such spaces purposely are small in order not to interfere with the draft. It also is old to provide chambers in metallurgic furnaces to recover the mineral from the gases, but not only is the question of draft not present but such chambers are cooling chambers to cause the mineral to deposit, which would destroy entirely any draft in a stack. It also is old to provide reinforced chambers in kilns to minimize the effect of dust explosions, but these chambers are so small as not to affect the draft in the stack. It never has been considered possible, however, to lessen the rate of flow in the products of combustion from boilers sufficiently to remove all the lighter particles from the products of combustion without destroying the draft necessary to be maintained. I discovered I could do this by the use of a chamber of exceedingly large proportions and affording space for expansion in all directions. I also discovered that I could increase the effectiveness of the deposit without interference with the draft by changing the direction of flow of the expanded gases. The preservation of the heat of the gases is a material aid in maintaining the necessary draft in the stack which I have facilitated by constructing the chamber of non-heat-conducting material. The inclosing of the stack by the chamber and the flow of hot gases about it also aids in maintaining the draft as the gases will not be cooled as soon as they enter the stack, it being well known that the draft of a stack depends largely upon the difference in temperature between the outside air and the gases in the stack.

Many other embodiments of my invention will be apparent to those skilled in the art without departing therefrom or from the scope of the claims.

What I claim and desire to protect by Letters Patent is:

1. In an apparatus for removing non-gaseous particles from the products of combustion from boilers, a boiler, a stack, and a chamber surrounding said stack of relatively very large proportions as compared with said boiler and said stack through which said products of combustion from said boiler pass and expand before entering said stack, whereby the velocity of said products of combustion is reduced sufficiently to effect a deposition of non-gaseous particles carried thereby.

2. In an apparatus for removing non-gaseous particles from the products of combustion from boilers, a boiler, a stack, a chamber surrounding said stack of relatively very large proportions as compared with said boiler, and said stack through which said products of combustion from said boiler pass and expand before entering said stack, and a passageway within said chamber communicating with said stack and provided with an opening so located that said products of combustion enter said passageway in a direction opposite to that in which they enter said chamber.

3. In an apparatus for removing non-gaseous particles from the products of combustion from boilers, a boiler, a stack, and a chamber of relatively very large proportions as compared with said boiler and said stack through which said products of combustion from said boiler pass and expand before entering said stack, and a passageway communicating with said stack having an opening in the top thereof for the entrance of said products of combustion said passageway being approximately two-thirds the height of said chamber.

4. In an apparatus for removing non-gaseous particles from the products of combustion from boilers, a boiler, a stack, and a non-heat-conducting chamber surrounding said stack of relatively very large proportions as compared with said boiler and said stack through which said products of combustion from said boiler pass and expand before entering said stack, whereby the velocity of said products of combustion is reduced sufficiently to effect a deposition of non-gaseous particles carried thereby.

5. In an apparatus for removing non-gaseous particles from the products of combustion from boilers, a boiler, a stack, a non-heat-conducting chamber of relatively very large proportions as compared with said boiler and said stack through which said products of combustion from said boiler pass and expand before entering said stack, and a passageway within said chamber communicating with said stack and provided with an opening so located that said products of combustion enter said passageway in a direction opposite to that in which they enter said chamber.

6. In an apparatus for removing non-gaseous particles from the products of combustion from boilers, a boiler, a stack, and a non-heat-conducting chamber of relatively very large proportions as compared with said boiler and said stack through which said products of combustion from said boiler pass and expand before entering said stack, and a passageway communicating with said stack having an opening in the top thereof for the entrance of said products of combustion said passageway being approximately two-thirds the height of said chamber.

7. In an apparatus for removing non-gaseous particles from the products of combustion from boilers, a boiler, a stack, a chamber of relatively very large proportions as compared with said boiler and said stack through which said products of combustion from said boiler pass and expand before entering said stack, and a passageway communicating with said stack and provided with an opening so located that said products of combustion enter said passageway, in a direction opposite to that in which they enter said chamber.

8. In an apparatus for removing non-gaseous particles from the products of combustion from boilers, a boiler, a stack, a non-heat-conducting chamber of relatively very large proportions as compared with said boiler and said stack through which said products of combustion from said boiler pass and expand before entering said stack, and a passageway communicating with said stack and provided with an opening so located that said products of combustion enter said passageway in a direction opposite to that in which they enter said chamber.

9. In an apparatus for removing non-gaseous particles from the products of combustion from boilers, a boiler, a stack, and a non-heat-conducting chamber of relatively very large proportions as compared with said boiler and said stack through which said products of combustion from said boiler pass and expand before entering said stack, whereby the velocity of said products of combustion is reduced sufficiently to effect a deposition of non-gaseous particles carried thereby.

10. In an apparatus for removing non-gaseous particles from the products of combustion from boilers, a boiler, a stack, and a chamber of relatively very large proportions as compared with said boiler and said stack through which said products of combustion from said boiler pass and expand before entering said stack, said chamber being so constructed or arranged as to prevent such loss of heat from said products of combustion as would materially reduce the draft in the stack.

In testimony that I claim the foregoing I have hereunto set my hand.

THOMAS GRIEVE.

Witnesses:
NELSE H. JOHNSON,
CHAS. J. GREGG.